No. 632,750. Patented Sept. 12, 1899.
J. J. RIDGWAY.
CONVEYER BELT.
(Application filed Dec. 2, 1898.)
(No Model.)
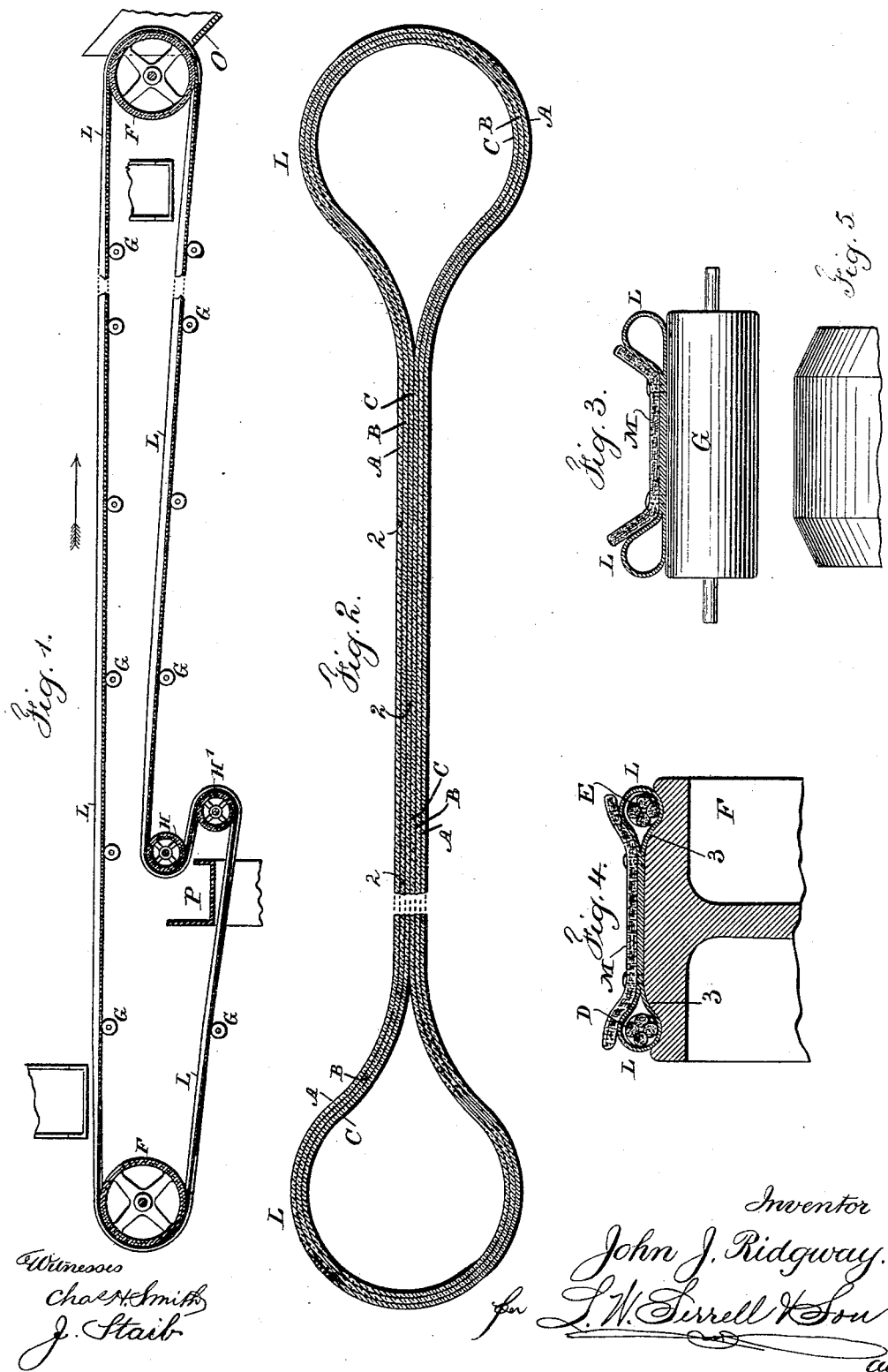

UNITED STATES PATENT OFFICE.

JOHN J. RIDGWAY, OF NEW YORK, N. Y.

CONVEYER-BELT.

SPECIFICATION forming part of Letters Patent No. 632,750, dated September 12, 1899.

Application filed December 2, 1898. Serial No. 698,049. (No model.)

*To all whom it may concern:*

Be it known that I, JOHN J. RIDGWAY, a citizen of the United States, residing at New York, (New Brighton,) in the county of Richmond and State of New York, have invented an Improvement in Conveyer-Belts, of which the following is a specification.

Conveyers for coal, ore, mineral, or other substances have been made of a belt, and in most instances the edges of the belt have been bent upward, so as to give the belt approximately a trough shape, and in other instances rubber tubes have been fastened to the surface of the belt closely adjacent to the edges, and in still other cases rims of rubber have been placed on each edge of the belt, in all cases with the object of preventing the material from dropping off. Belts of this character are exposed to very severe wear by the constant changing of the belt from the flat to the troughing shape as it passes over the carrying-pulleys, thereby disintegrating the belt and breaking the bond between the plies at the line of fold, and this is augmented by flattening the rim of the belt when passing around the end pulleys, and where the belt is long the pull upon the belt in moving it from one position to another is also very severe. In my present improvement the fabric of which the belt is composed is folded so that the edges of the fabric are brought together near the middle of the belt, while the edges of the belt itself are hollow, so that such edges can be inflated, and when passed over substantially cylindrical rollers the hollow edges of the belt stand up sufficiently high to give to the belt a trough shape for receiving coal, ore, ashes, flour, meal, or other material, and these hollow edges of the belt are also adapted to receive ropes, by which the tension for drawing the belt along and the material upon it is taken principally upon the ropes and the belt itself largely relieved from the tension necessary in giving motion thereto, and the end pulleys or rollers around which the belt passes in changing its direction are to be made to conform to the belt—that is to say, the ends of such rollers are advantageously conical—so that the two surfaces of the belt are approximately the same shape and undue strain or distention of the hollow portions near the edges of the belt is avoided, and where the edges of the belt fabric come together they are advantageously lapped so as to break joints.

In the drawings, Figure 1 is a diagrammatic illustration of the endless belt around its respective rollers. Fig. 2 is a cross-section in larger size, illustrative of the manner in which the layers of fabric are put together in making up the belt. Fig. 3 is a cross-section showing the trough-shaped belt upon its cylindrical roller. Fig. 4 is a cross-section illustrating the belt where it passes around one of the end drums or rollers in changing directions, and Fig. 5 shows part of an end pulley for the belt represented in Fig. 3.

The belt is preferably made of closely-woven canvas in two, three, or more layers or thicknesses, cemented together by rubber or similar material. I have shown three thicknesses of fabric A B C, and in laying up the thicknesses and constructing the endless belt it is advantageous to employ canvas twice the width of the complete belt, so that the layers of fabric can be doubled at each edge, bringing the edges 2 2 of the fabric closely together near the center of the trough-shaped part; and it is also advantageous that the edges should not all be upon one line, but should be in a position to break joints, as indicated in Fig. 2; and after the belt has been properly laid up with india-rubber or other adhesive material it may be cured, as usual; and in folding over the fabric of the belt the edge portions are to be left hollow to any desired extent; and the opening is preferably uniform, or nearly so, throughout each side of the endless belt; and after completion the hollow edges of the belt may be more or less inflated, so as to have the desired pressure within such hollow edges. I prefer and use ropes D E, of manila or similar material, introduced into the hollow edges of the belt and connected up with tension-couplings, as is done in single-rope drives, and of such length that the strain comes upon the ropes and the belt is relieved to the desired extent.

The rollers F or pulleys around which the endless belt passes from one position to another are to be cylindrical where the central portion of the belt passes, and the end portions 3 are of reduced diameter to correspond to the normal condition of the belt as manufactured—that is to say, the hollow edges L extend equally above and below a central plane passing through the fabrics of the belt, so that undue strain upon the hollow edge portions of the belt in passing around the end rollers or pulleys is avoided, and it is also advantageous to terminate the conical ends of the end rollers as grooves adapted to fit the exterior surface of the belt when it contains the ropes, so that the motion may be given to the endless belt through the action of the ropes without undue strain upon any part of the belt; but where the belt is employed to receive any material to be conveyed from one place to another such belt is to be made to assume a maximum trough shape, and with this object in view the straight cylindrical rollers G are employed at intervals, and hence the bottom surface of the conveyer-belt will be flat and the hollow edges of the belt will be raised up, and the upper surface of the belt will hence assume the proper trough shape (see Fig. 3) to receive the material to be transported.

The delivery of the material from the belt can be made at any desired point. In some instances it will be at the end roller, where the belt passes down and around such roller, the material sliding off the belt into any suitable hopper or receptacle, (illustrated at O.)

In many instances belts of this character are arranged to receive material and convey the same in one direction and deliver the same at any intermediate point or at the end pulley or roller and then to receive other material upon the under or return portion of the belt to convey the same in an opposite direction and to deliver such material at any point before the belt reaches the distant pulley around which the same returns, and in carrying out this feature of the invention rollers H H' may be provided for the belt to pass over in an S shape, so that the delivery may be into a trough or receptacle P, passing off laterally.

It is to be understood that I do not limit myself to any particular arrangement of supply hopper or chute or delivery hopper or chute or to any particular direction in which the belt may be caused to travel between the reception of the material and its delivery.

The material may be allowed to slip off the edges of the belt laterally if the belt is raised up by a pulley that acts below the center of the belt longitudinally.

The ropes D E may be held in the edges of the belt fabric in any desired manner.

When the ropes D E are not used, the pulleys F, H, and H' may be made with conical ends, as illustrated in Fig. 5.

When the belt is used for handling roasted ores or other material in a hot condition, I apply a sheet of asbestos to the surface of the belt, as shown at M, the same being riveted or otherwise attached and of sufficient thickness to prevent the heat injuring the belt.

I claim as my invention—

1. The conveyer-belt composed of a fabric that is double thickness in the middle portion from side to side and single thickness at the tubular edges, the single fabric at the edges being folded around from the top to the bottom portion, the said middle portion being of double thickness where strength is required, substantially as set forth.

2. A conveyer-belt having tubular edges formed by folding over the fabric and securing the flat middle portions together and ropes within such tubular edges, the belt and ropes being endless, substantially as set forth.

3. A conveyer-belt having tubular edges and ropes within such edges, the belt and the ropes being endless, in combination with pulleys that are cylindrical in the middle portion and reduced in diameter toward the ends in line with the ropes in the belt, substantially as set forth.

4. The endless conveyer-belt composed of a fabric folded over upon the edges and secured together at the flat middle trough-shaped portion so that the edges are tubular, in combination with pulleys by which a motion is given to the endless belt and intermediate rollers that are cylindrical and support the belt and cause the tubular edges to form the edges of the trough-shaped conveyer, the bottom of such belt being substantially flat, substantially as set forth.

5. The endless conveyer-belt composed of a fabric folded over at the edges and secured together at the middle trough-shaped portion, so that the edges are tubular, in combination with pulleys that are cylindrical to support the flat portion of the belt, and the end portions of the pulleys are of reduced diameter for receiving the tubular edges, substantially as set forth.

Signed by me this 29th day of November, 1898.

JNO. J. RIDGWAY.

Witnesses:
GEO. T. PINCKNEY,
S. T. HAVILAND.